United States Patent [19]

Lapeyre

[11] 4,305,312

[45] Dec. 15, 1981

[54] BICYCLE TRANSMISSION

[76] Inventor: Fernand S. Lapeyre, 1224 Octavia St., New Orleans, La. 70115

[21] Appl. No.: 968,989

[22] Filed: Dec. 13, 1978

Related U.S. Application Data

[63] Continuation-in-part of Ser. No. 810,112, Jun. 27, 1977.

[51] Int. Cl.³ .......................... F16H 3/44; F16H 5/06
[52] U.S. Cl. .................................. 74/750 B; 74/335; 74/337.5
[58] Field of Search .................. 74/750 B, 335, 337.5, 74/366; 192/6 A

[56] References Cited

U.S. PATENT DOCUMENTS

| | | | |
|---|---|---|---|
| 2,047,174 | 7/1936 | Baumgartner . | |
| 2,165,201 | 7/1939 | Baumgartner . | |
| 3,766,805 | 10/1973 | Shea et al. | 74/750 B X |
| 3,842,691 | 10/1974 | Shea | 74/750 B X |
| 4,059,028 | 11/1977 | Schulz et al. | 74/750 B X |
| 4,147,244 | 4/1979 | Segawa | 74/750 B X |

FOREIGN PATENT DOCUMENTS 183921 4/1936 Switzerland .

Primary Examiner—Leslie Braun
Attorney, Agent, or Firm—Nims, Howes, Collison & Isner

[57] ABSTRACT

A multi-speed bicycle transmission located at the drive pedal hub and including a drive pedal actuatable shifting assembly for effecting gear change in response to limited reverse rotation of the drive pedal shaft at a pair of predetermined locations in the path of rotative displacement thereof. The drive pedal responsive shifting assembly further includes a slidable collar on the drive pedal shaft having two pairs of selectively contoured camming means thereon that are engageable by radially displaceable shift pin means extending into the pedal hub to effect longitudinal displacement of said collar on said collar on the drive pedal shaft and accompanying shifting of the gears in response thereto.

19 Claims, 16 Drawing Figures

BICYCLE TRANSMISSION

This application is a continuation in part of my copending application Ser. No. 810,112 filed June 27, 1977.

This invention relates to multi-speed bicycle transmissions and more particularly to an improved, pedal hub located and drive pedal responsive multi-speed bicycle transmission system.

Although bicycles have been widely used for a long period of time, recent years have witnessed a widespread increase in the popularity of bicycling as a healthful and enjoyable recreational activity, as well as a renewed awareness of their utility as an inexpensive means of individualized local transportation. As a concommitant thereto, there has been a renewed emphasis on the utilization of multi-speed transmission systems for bicycles to enhance their operational efficiency over various types of terrain and to accommodate the every expanding differences in the state of physical conditioning and capabilities of the users thereof. Although the patented art is replete with many different types of suggested multi-speed transmission systems, economic realities and practical considerations have apparently limited widespread commercial usage to two, three and five speed transmissions located within the rear wheel hub and to the widely utilized ten speed transmissions of the "derailleur" type, all of which are normally operable in response to a cable connected and manually manipulatable shift lever and which require a hand operated brake system. Also used, but to a lesser extent, are the more complicated drive pedal manipulative types of rear wheel hub multi-speed transmissions that are compatible with coaster brake drive systems, as for example, the Fichtel and Sachs AG "Torpedo" transmissions.

Among the many suggested bicycle transmission systems disclosed in the patented art are numerous disclosures of coaster brake compatible, rear wheel hub transmissions activated by reverse drive pedal rotation, as exemplified by the patents of Schwerdhofer (for example—U.S. Pat. Nos. 3,648,809, 3,270,589, 3,200,699, 3,180,181, 3,147,641); Hood (for example—U.S. Pat. Nos. 3,022,682, 2,993,575, 2,982,384, 3,972,908, 2,940,339) and Gleasman (for example—U.S. Pat. Nos. 3,354,750, 2,993,389, 2,903,913, 2,914,152). Other suggested and exemplary expedients for rear wheel hub transmission systems include reverse drive pedal actuatable epicyclic gear systems as disclosed in U.S. Pat. Nos. 3,351,165, 3,433,097, 3,803,947 and 3,726,156 and manually selectable rear wheel hub transmissions as embodied in U.S. Pat. Nos. 3,653,273 and 3,886,811.

Rear wheel hub multi-speed transmission systems, and particularly those that are coaster brake compatible, are of relatively complicated construction with diminutively sized components dictated by the limited available space. As such and because of the wheel diameter lever arm inherent in rear wheel hub located multi-speed transmissions, such are unduly subject to damage through normal, much less abusive, use and the repair thereof is usually both relatively difficult and expensive. Even the simpler rear wheel hub multi-speed transmission systems that are widely employed in hand brakeable bicycles, such as the Sturmey-Archer three speed and "derailleur" type multi-speed transmissions, are subject to hub component and gear shift cable damage that necessitate relatively expensive repairs as well as requiring diversion of the rider's attention when manual shifting is to be effected.

Early expedients for proposed utilization of the drive pedal hub area as a situs for multi-speed transmission components for bicycles are illustrated in U.S. Pat. Nos. 2,047,174 and 2,165,201 and in Swiss Pat. No. 183,921. In each of these patents an in-line type of multi-speed transmission is employed, apparently sized to be contained within the drive pedal hub. Selective gear engagement was therein effected by spring biased radial pawl displacement induced by a control cam element disposed within an axial bore within the drive pedal shaft and operable in response to reverse rotation of the pedal drive shaft. Such approach is also characterized by diminutively sized omponents unduly subject to damage in a high stress location.

Recent years have witnessed a refocussing of attention upon the drive pedal hub as a suitable situs for multi-speed transmission components for bicycles. One suggested expedient includes the utilization of a planetary gear system adjacent to the drive pedal hub that is compatible with a rear wheel hub coaster brake assembly but which requires manual operation of an external gear shift lever to effect shifting. Such a suggested construction is disclosed in the Shea U.S. Pat. Nos. 3,727,484, 3,766,805 and 3,842,691. Other suggested expedients include impact responsive shifting mechanisms, and manually controllable variations in the main drive pedal sprocket diameter. Illustrative of such expedients are U.S. Pat. Nos. 2,600,586, 1,608,141 and 3,506,100 and various publications such as Design News of Dec. 16, 1974 (pp. 46–7) and Product Engineering of June 1973 (p. 13).

BRIEF DESCRIPTION OF THE INVENTION

The invention may be briefly described as an improved multi-speed bicycle transmission located at the drive pedal hub and uniformly operable in response to a limited degree of simple pedal manipulation under all conditions of cycle operation from zero to maximum attainable speed. In its broader aspects, the subject invention includes an improved self-contained, drive pedal hub located, in-line type multi-speed transmission wherein a plurality of change speed drive gears are journalled on the pedal drive shaft and are in constant running engagement with corresponding companion spur gears and wherein a shifting mechanism responsive to selective reverse rotation of the drive pedal shaft is disposed within the drive pedal hub and is selectively operable to couple individual change speed drive gears in driving engagement to the pedal drive shaft to provide a plurality of preselectable and different transmission ratios for the main pedal drive sprocket. In this narrower aspects, the subject invention includes a pedal hub located transmission wherein upshifting and downshifting is effected, in the absence of driving stresses, by limited reverse rotation of the pedal drive shaft at a pair of preselected locations in the normal path of rotative displacement thereof and wherein the driving interconnections between the drive gears and the drive shaft is effected by means subjected only to compressive stress under drive conditions.

Among the manifold advantages of the subject invention is the provision of an improved multi-speed bicycle transmission that may be used alone with hand brakeable bicycles in accord with the desires and dictates of the rider and which may be compatibly employed in association with certain existing hand brakeable, ger shift operated and coaster brake incompatible multi-speed rear wheel hub transmissions, such as the widely employed Sturmey-Archer three speed transmissions, to conveniently provide an expanded number of available transmission ratios. Further advantages include the provision of an in-line transmission located at the drive pedal hub, wherein the stress magnitudes on the shifting and drive components are relatively small, wherein the gears may be preselected to provide any desired gear ratios and which gears may be readily interchanged to modify the gear ratios whenever required. Another advantage includes the general provision of an inline multi-speed transmission wherein the critically stressed drive system components, such as the interconnection of the drive gears with the drive shaft, are subjected only to compressive stresses when drivingly engaged. Other advantages include the provision of a factory assembled and sealed in-line type of multi-speed transmission of rugged and durable character for bicycles that affords a long operating life and singular freedom from maintenance and repair. Further advantages include the provision of a drive pedal actuable gear shifting mechanism that dispenses with control cables, that does not require the rider to remove his hands from the handle bars or divert his attention from the path of bicycle travel during the shifting operation and which is operable by simple, facile and rapid drive pedal manipulation within limited arcs of reverse pedal displacement at readily locatable positions in their path of rotation, all to the end of readily permitting rapid gear shifting in times of emergency or the like. Still other advantages include the provision of an improved multi-speed bicycle transmission of the in-line type where shifting can be effected independent of the speed of the bicycle, including while at rest, wherein all components are automatically disposed in an effectively stress free condition when shifting is being effected and wherein one set of gears, even during the shifting operation, is always drivingly engaged. A still further advantage is the permitted avoidance of all hand manipulative operations for shifting purposes, which not only permits continued manual control of steering and braking at all times but which also dispenses with any necessity for visual diversion from the path of travel with increased safety for the bicycle rider. Still further advantages of the subject invention include the provision of a reliable and economic in-line type of multi-speed transmission for bicycles that is effectively immune to damage arising from any pedal manipulation.

The primary object of this invention is the provision of an improved multi-speed transmission for bicycles.

Another primary object of this invention is the provision of a pedal hub locatable and drive pedal actuatable multi-speed bicycle transmission of improved character.

Another object of this invention is the provision of a pedal hub located and drive pedal operable multi-speed bicycle transmission wherein shifting is effected by selective pedal manipulation in accord with the dictates and desires of the rider.

A still further object of this invention is the provision of an improved pedal hub located and drive pedal operable multi-speed bicycle transmission that can be used alone in hand brakeable bicycles or in association with coaster brake incompatible rear wheel hub transmissions to inexpensively provide an expanded number of available gear ratios.

Other objects and advantages of the subject invention will become apparent from the following portions of this specification and from the appended drawings which illustrate, in accord with the mandate of the patent statutes, a presently preferred drive pedal operable multi-speed bicycle transmission construction incorporating the principles of this invention.

BRIEF DESCRIPTION OF THE DRAWINGS

Referring to the drawings.

DETAILED DESCRIPTION OF THE INVENTION

Figure 1:
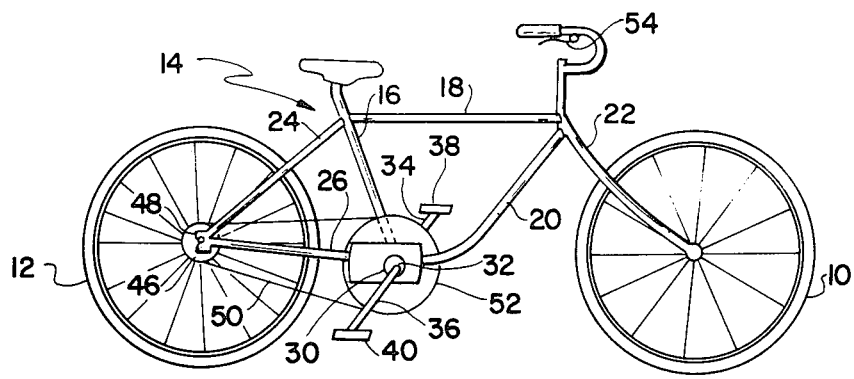
FIG. 1 is a schematic side elevational view of a bicycle constructed in accord with the principles of the invention.

Referring to the drawings and initially to FIG. 1, there is provided a bicycle having a front steerable wheel 10 and a rear driving wheel 12 mounted on a frame, generally designated 14. The frame 14 is of conventional tubular construction and generally includes a substantially vertical seat post member 16, a horizontal upper member 18, an angularly disposed lower member 20, a bifurcated front wheel support 22, a bifurcated rear wheel support 24 and a pair of rearwardly extending lower members 26. The seat post member 16, lower member 20 and rearwardly extending lower members 26 commonly terminate at a transverse cylindrical pedal drive shaft hub, generally designated 30, which, as will hereinafter be described, forms a portion of the housing for the improved multi-speed transmission system incorporating the principles of this invention. For introductory explanatory purposes, however, such bicycle also includes a transversely disposed drive pedal shaft 32 journalled in the hub 30 having conventional opposed right and left pedal cranks 34 and 36 terminally mounted thereon. Rotatably mounted at the terminal ends of the cranks 34 and 36 are independently rotatable drive pedals 38 and 40 respectively. For clarity of description herein, the terms "right" and "left" will accord with the right and left sides of the bicycle rider as he would normally use the bicycle. The rear or drive wheel 12 includes a hub 46 and sprocket 48 drivingly connected by a chain 50 to the main drive sprocket 52 mounted on the right side of hub 30. The sprocket 52 is positively driven, through the hereinafter described transmission, by rotation of the pedal cranks 34 and 36 in the clockwise direction as viewed from the right. Hand levers 54 are mounted on the handle bars for actuation of conventional wheel rim brake pads.

Figure 2:
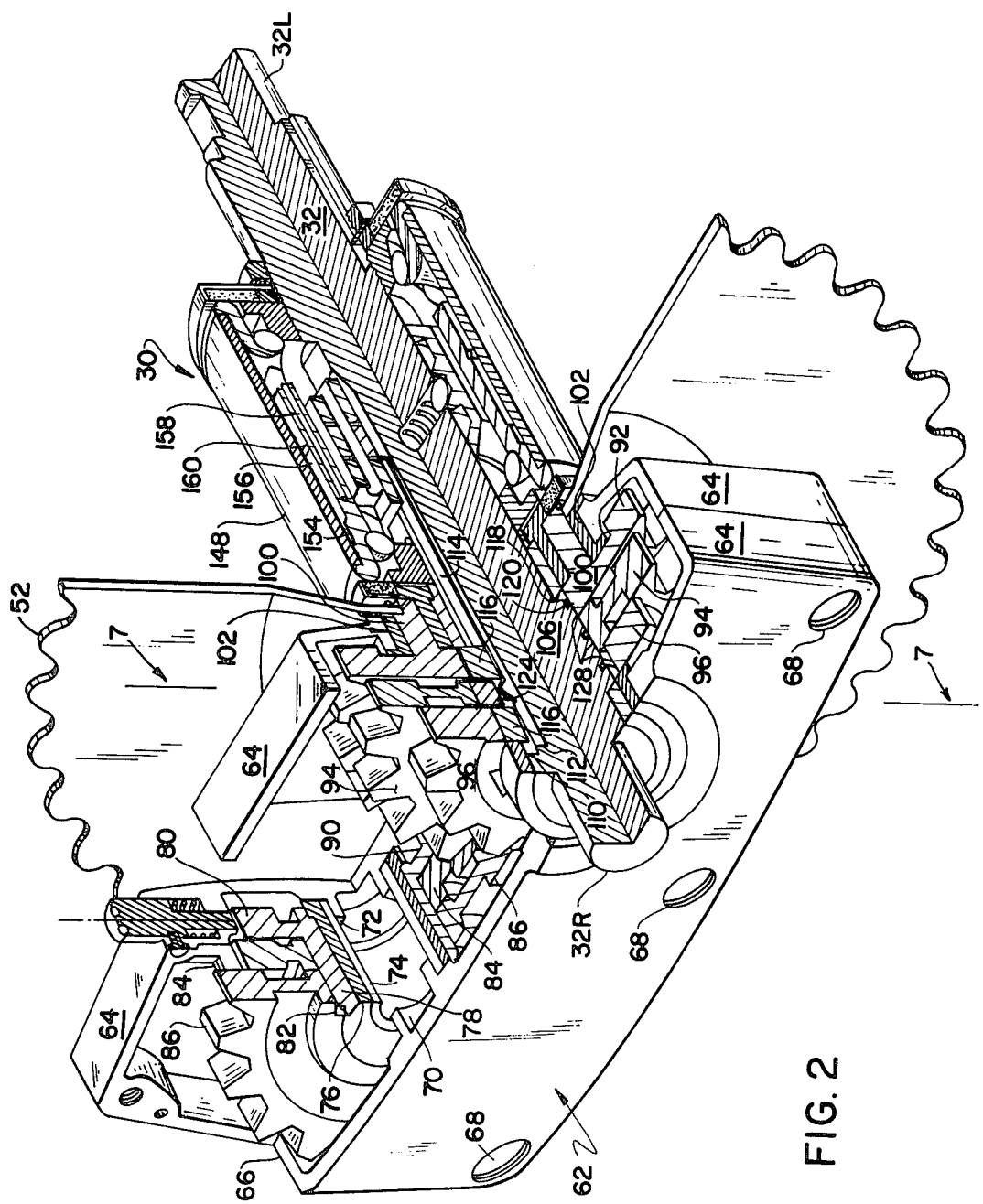
FIG. 2 is a schematic oblique view, partially cut away and sectioned, of a pedal hub located and drive pedal actuatable multi-speed bicycle transmission constructed in accord with the principles of this invention; and including, for the purposes of convenience and clarity of illustration and explanation, certain components that are rotationally displaced from the normal location thereof as shown in FIG. 3.
Figure 3:
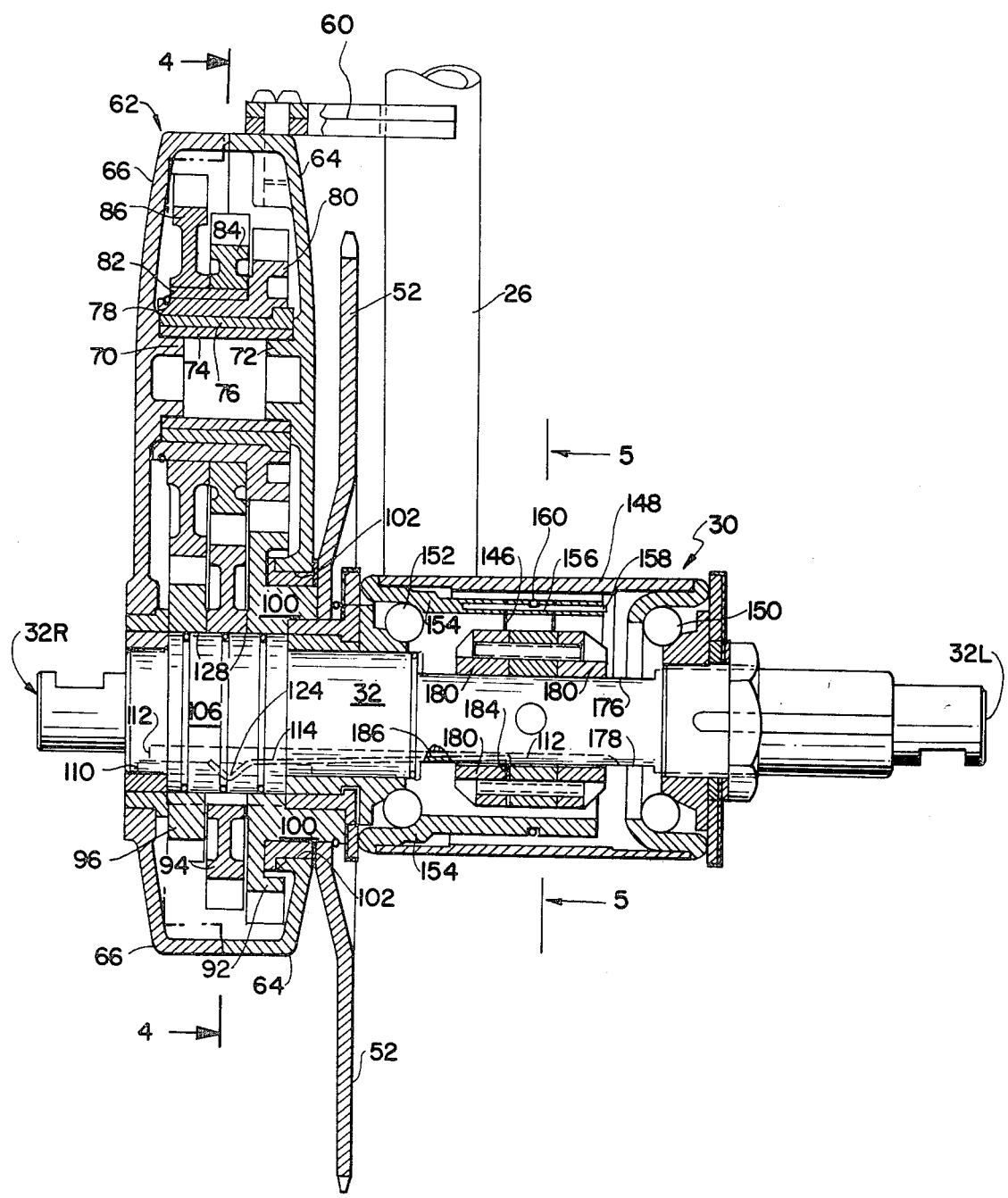
FIG. 3 is a horizontal section through the pedal hub located multi-speed bicycle transmission constructed in accord with the principles of this invention; and as taken on the line 3—3 of FIG. 4.
Figure 4:
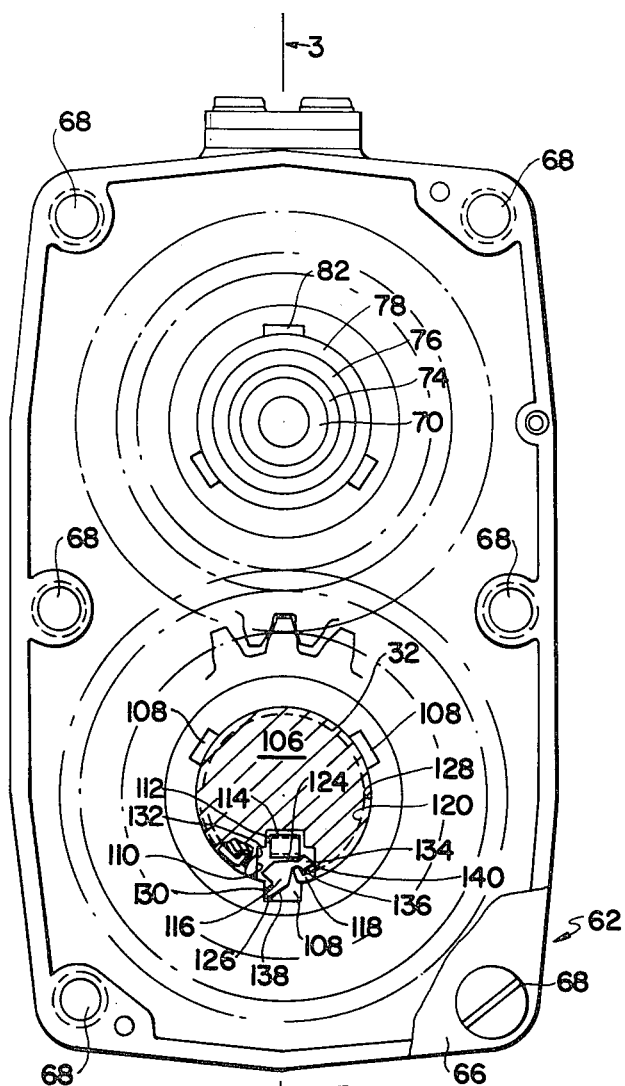
FIG. 4 is a section as taken on the line 4—4 of FIG. 3.

Referring now to FIGS. 2 through 4, and from which the right and left pedal cranks 34, 36 and pedals 38, 40 have been omitted for drawing clarity, there is provided a generally rectangular gear housing 62 disposed between the main drive sprocket 52 and the right hand terminal end 32 R of the drive pedal shaft 32. The gear housing 62 may be positioned by a U shaped bracket 60 engaging one of the rearwardly extending lower members 26 and is conveniently formed of casing halves 64 and 66 secured together by screws 68. Disposed within the gear housing 62 is a multi-element in-line transmission of the general type disclosed in U.S. Pat. No. 3,812,735. The specifically illustrated transmission is a three speed transmission and, as will be apparent to those skilled in the art, any speed multiple can be accommodated within the orbit of the disclosed invention.

More specifically, however, the casing halves 64 and 66 are internally shaped to provide a pair of inwardly directed stub axles 70, 72 that support a stationary bearing sleeve 74. Rotatably mounted on the stationary bearing sleeve 74 is a freely rotatable bearing sleeve 76 having secured thereto the cylindrical hub 78 of a first spur change gear 80. Mounted on the hub 78 of the first spur change gear 80 and splined thereto, as at 82, for concurrent rotation therewith are any desired number of additional spur change gears, as for example, the second and third spur change gears 84 and 86 for the illustrated three speed transmission. As will now be apparent, the three spur change gears 80, 84 and 86 and the bearing sleeve 76 are journalled for free but concurrent rotation about the stationary bearing sleeve 74.

Disposed in constant running meshed engagement with the three spur change gears 80, 84 and 86 respectively are three drive gears 92, 94 and 96. The drive gears 92, 94 and 96 are journalled for independent and individually free rotation about a diametrically enlarged hub portion 106 of the pedal drive shaft 32 and, as will be described hereinafter, are adapted to be disposed in individual selected driving engagement therewith. The intermost drive gear 92 is shaped to include an axially extending cylindrical flange or skirt portion 100 that is sized to extend through a suitable bore 102 in the left casing half 64 and has the main drive sprocket 52 mounted on keyed engagement thereon for rotation in conjunction therewith.

Figure 7A:
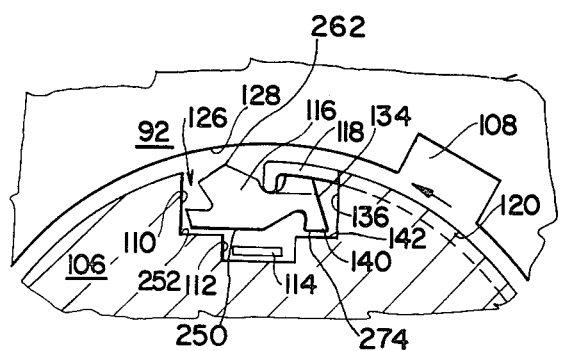
FIGS. 7A and 7B are enlarged partial sections as would be taken on the line 7—7 of FIG. 2 to illustrate the driving interconnection of the pedal shaft with the drive gears.

The bores 128 of the drive gears 92, 94 and 96 are sized to be rotatably supported by the enlarged hub portion 106 of the pedal drive shaft 32 and each such bore 128 includes a plurality of generally rectangular pawl engageable recesses 108 therein. As shown in FIGS. 2–4 and as also shown in enlarged form in FIGS. 7A and 7B, the enlarged hub portion 106 of the pedal drive shaft 32 includes an elongate longitudinal pawl containing outer recess 110 overlying the outwardly facing end of an inner and small elongate longitudinal channel 112 sized to extend along the pedal drive shaft 32 and adapted to contain therewithin an elongate displaceable leaf spring type actuating member 114. Disposed at the terminal end of the elongate leaf spring type actuating member 114 operatively related to the drive gears 92, 94 and 96 is an angularly shaped cam surface 124 that is normally biased radially outwardly from the axis of the pedal shaft 32 and upwardly toward and into the outer recess 110. Disposed within the outer longitudinal recess 110 are a plurality of discrete and selectively shaped drive pawl members 116, one for each of the drive gears 92, 94 and 96. Each of the pawl members 116 is normally biased downwardly within the recess 110 and out of driving engagement with the respective pawl engageable recesses 108 in the bores 128 of the drive gears 92, 94 and 96 by the action of the ring type biasing springs 118 contained within the circumferential recesses 120 in the enlarged hub portion 106.

Figure 8A:
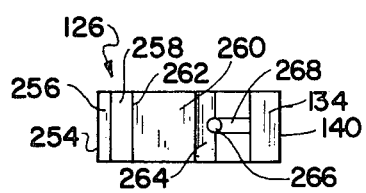
FIGS. 8A and 8B are plan and vertical sectional views respectively of the pawl members that provide the driving interconnection between the pedal drive shaft and the drive gears.
Figure 8B:
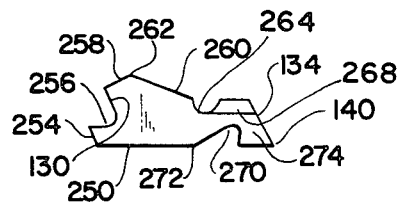

The pawl members 116 are all of similar configuration and comprise a generally rectangularly shaped block of metal of high compressive strength. As best shown in FIGS. 8A and 8B, and to a lesser extent in FIGS. 4, 7A and 7B, each pawl 116 includes a front portion 126 having a flat undersurface 250 sized to rest upon and be supported by the shoulder 252 forming the bottom of the recess 110. The front wall portion 254 includes a recess 256 and an inclined wall 130. The upper surface of the front of the pawl includes two oppositely inclined surfaces 258 and 260 having a crest 262 at their apex. Disposed at the rear of the inclined surface 260 is a transverse slot or recess 264 having a spring wire receiving bore 266 in the center thereof. Intersecting the transverse slot 264 at the bore 266 is a longitudinal channel 268 sized to accommodate the end of the ring type biasing spring 118. The undersurface of the pawl 116 includes an intermediate recess 270 defining a bearing surface 272 and a rearward heel portion 274 terminating in a pivot 140 adapted to be seated at the junction of the bottom and side defining walls of the recess 110. Extending upwardly from the pivot 140 is an inclined rear wall portion 134.

As will hereinafter be pointed out, the front and rear inclined walls 130 and 134 comprise the load bearing surfaces of the pawl members 116 and are disposed in substantially parallel relation to each other.

The above described pawl configuration serves to permit the ring type biasing springs 118 to normally bias the pawls 116 into seating engagement with the shoulder 252 forming the floor of the recess 110 and in bridging position over the inner channel 112. Such springs 118 also serve to maintain the pivot 140 at the apex 142 of the angle formed by the vertical wall 136 and shoulder 252 of the recess 110 and to thus permit selective pivotal and radially outward displacement of the front end portion of the pawls 116 while maintaining said pivot fixed in position.

Figure 7B:
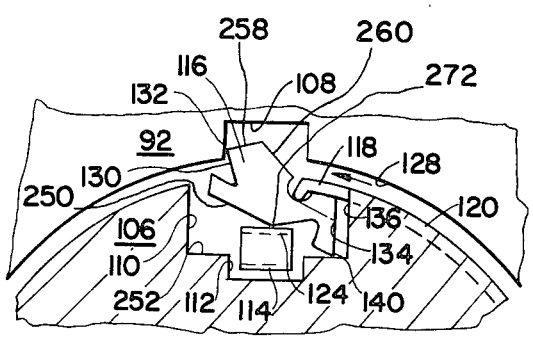

As will now be apparent, each of the drive gears 92, 94 and 96 is freely rotatable on the enlarged hub portion 106 of the pedal drive shaft 32 and each of the pawls 116 is normally biased downwardly within the longitudinal recess 110 by the action of its respective ring type biasing spring 118. As most clearly shown in FIG. 7A, when a pawl 116 is so biased, it is out of engagement with its drive gear and there is no driving engagement between the enlarged hub portion 106 of the pedal drive shaft 32 and the drive gear associated with said pawl. Elevation of the front end 126 of a selected pawl 116 upwardly and out of the recess 110 is effected by longitudinal displacement and selective positioning of the elongate leaf spring type actuating member 114 within the elongate recess 112 in the pedal drive shaft 32. The selective engagement of the angularly shaped terminal end 124 thereof, due to the biasing action of said leaf spring actuating member 114, with the underside of a pawl 116, as shown in FIGS. 4 and 7B, overcomes the action of its ring type biasing spring 118 and pivotally elevates the front end 126 of the pawl 116 radially outwardly of the recess 110. Due to the interaction of the outwardly directed biasing action of the cam surface 124 on the leaf spring type actuating member 114 on the underside of a pawl 116 and the restraining action of the ring spring 118 associated therewith, a pawl is rotated about its heel 140 in the corner 142 of recess 110. Such pivotal pawl displacement places the crest 262 on the top of the pawl 116 into compressive engagement with defining surface of the bore 128 of the selected drive gear. Since the pedal drive shaft 32 will normally be rotating in the direction of the arrow in FIGS. 7A and 7B when the bicycle is being pedaled in the forward direction, the so upwardly biased pawl 116 will soon reach one of the recesses 108 and will be further upwardly displaced therein under the continued biasing action of the actuating member 114. Upon entry of the pawl 116 into a recess 108 and with continued rotation of the pedal drive shaft in the bicycle advancing direction as indicated by the arrows in FIGS. 7A and 7B, the inclined wall 130 on the front of the pawl will be disposed and maintained in compressive interfacial engagement with the wall 132 of the recess and the rear wall 134 of the pawl will be disposed in compressive interfacial engagement with the wall 136 of the recess 110. When so engaged and positioned, as illustrated in FIG. 7B, a direct driving connection is thus established between the forwardly rotating enlarged hub portion 106 of the pedal drive shaft 32 and a selected drive gear, as for example gear 92, and such driving connection will be effectively maintained, and/or readily reestablishable, until the elongate leaf spring type actuating member 114 is longitudinally displaced within the channel 112 out of engagement with the drive pawl 116 for such gear 92.

The sloped upper surface 260 of the drive pawl 116 permits ready advance of the engaged drive gear relative to the drive shaft 32 as would occur when the forward rotative advance of the drive shaft 32 is halted or even reversed. Such halting of advance or reverse rotation of the pedal drive shaft 32 effects automatic disengagement of a drivingly engaged pawl from the recesses 108 in the gear bore 128 and its reintroduction into the recess 110 in the hub 110 without otherwise affecting the continued upward biasing of such pawl 116 by the action of the angularly shaped end 124 of the elongate leaf spring type actuating member 114. Such disengaging and retraction action permits the bike rider to coast with a temporary disengagement of all driving connection between the pedal drive shaft 32 and the main drive sprocket 52. The above described driving connection between an outwardly biased pawl 116 and a recess 108 in the bore 128 of the drive gear will automatically be reestablished when pedal drive shaft 32 rotation in the bicycle advancing direction is resumed by the rider.

As described above and as shown in FIGS. 4, 7A and 7B, the pawls 116 are selectively shaped to provide for parallel interfacial engagement between pawl surface 130 and sidewall 132 of recess 108 and also between pawl surface 134 and sidewall 136 of recess 110 to assure that the pawls are in compression at all times when a driving engagement exists between a drive gear and the pedal drive shaft 32.

As will now be apparent, the specifically illustrated and described set of drive and change gears is adapted to provide for three separate speed ratios for the main drive sprocket 52. For example, when the leaf spring actuating member 114 has been positioned within the longitudinal recess 112 in the pedal shaft 32 so that its cam shaped terminal end 124 elevates the pawl 116 into driving engagement with a pawl engageable recess 108 in the bore 128 of drive gear 92, the drive gear 92 will be directly driven by the rotation of the pedal drive shaft 32. At that time, the main drive sprocket 52 will be directly driven by gear 92 through its hub 100 and will be advanced at a 1 to 1 ratio with the rotation of the pedal drive shaft 32. Under such conditions, the gear 92 will also directly drive companion gear 80 which in turn will rotate change gears 84 and 86 in conjunction therewith. Change gears 84 and 86 will directly drive the freely rotatable drive gears 94 and 96, which are now unconnected to the enlarged hub 106 of pedal drive shaft 32, at speeds determined by the various gear ratios involved. If, under such conditions, that leaf spring actuating member 114 is longitudinally displaced within recess 112 out of engagement with the above-mentioned pawl 116 for gear 92 and into lifting engagement with the pawl 116 associated with drive gear 94, the drive gear 92 will be disengaged from driving engagement with the pedal drive shaft 32 by retraction of the drive pawl 116 therefore into the recess 110 and the pawl 116 underlying gear 94 will be elevated into driving engagement with the pawl engageable recess 108 in the bore 128 of the drive gear 94. Under such conditions, the gear 94 will be directly driven by the rotation of the pedal drive shaft 32. In this instance, however, drive gear 94 will directly drive companion gear 84 at a speed $W_1$ rpm, determined by the gear ratios therebetween.

Companion gear 84 will drive change gears 86 and 80 at the same speed $W_1$ rpm. Change gear 80, however, will now drive the now freely rotatable drive gear 92 at a speed $W_2$ rpm determined by the gear ratio therebetween and, of course, will thus drive the main drive sprocket 52 at the same speed $W_2$ rpm. At the same time, change gear 86 will also drive the freely rotatable drive gear 96 at a speed determined by the gear ratio therebetween. As will now be apparent, similar operation will be effected if the gear 96 is drivingly engaged with the pedal shaft 32.

The specific gear ratios for the drive and change gears may be suitably preselected to accommodate the preferences of the bicycle manufacturer.

It should also be noted, that under the above described action, at least one drive gear will always be drivingly engaged or biased for driving engagement with the pedal drive shaft 32. That is, the angularly shaped end 124 of the leaf spring actuating member 114 will always be in operative biasing engagement with at least one of the drive pawls 116.

Controlled longitudinal displacement of the elongate leaf spring actuating member 114 within the elongate channel 112 in the pedal drive shaft 32 to effect the selective driving engagement of the drive gears 92, 94 and 96 to the pedal drive shaft 32 through the above described selective elevation of the pawls 116, is effected by a drive pedal responsive shifting mechanism disposed within the pedal hub 30 that conventionally forms an integral part of the standard bicycle frame 14. To the above end, the pedal drive shaft 32 is journalled within the generally cylindrical shell 148 of the pedal hub 30 by spaced ball bearings 150, 152. Disposed between the ball bearings 150, 152 and within the shell 148 is a fixed cylindrical sleeve 154. In the illustrated embodiment, the interior surface of the sleeve 154 is of continuous character except for a rectangularly shaped aperture 146 therein. Disposed within the aperture 146 is a selectively displaceable rectangularly shaped sector-like member 156. The sector-like member 156 is pivotally mounted, as at 158, and serves as a hinged shift control member. Such control member 156 is normally biased, as by a ring type biasing spring 160, into its advanced or closed position as shown at 162 in FIG. 5. When so normally biased, its inner surface is disposed substantially flush with the remainder of the inner surface of the fixed sleeve 154.

Figure 9:
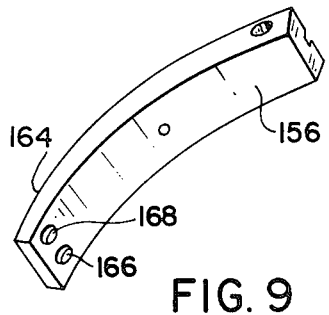
FIG. 9 is an oblique view of the pivotally mounted shift control member.
Figure 5:
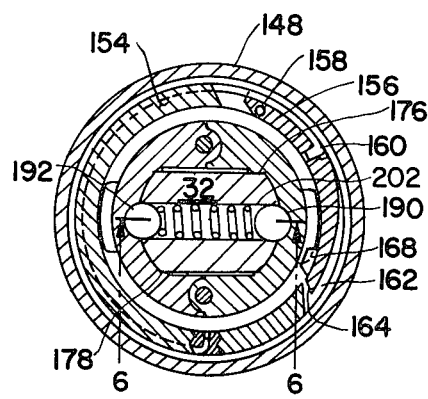
FIG. 5 is a section as taken on the line 5—5 of FIG. 3.

As shown in FIGS. 5 and 9, the shift control member 156 generally comprises an arcuate and pivotally displaceable flap like member having a pair of spaced inwardly directed and spaced pin members 166 and 168 (for the illustrated three drive gear transmission) mounted on the free end 164 thereof. As will later become apparent, the pins 166 and 168 are spaced apart a distance substantially equal to the spacing of the center lines of the drive gears 92, 94 and 96. The thickness of the control member 156 is progressively decreased from its pivotal mounting 158 to its free end 164 in order to permit radially outward pivotal displacement of said free end 164 against the restraining action of the biasing spring 160, as will be hereinafter described.

Figure 6:
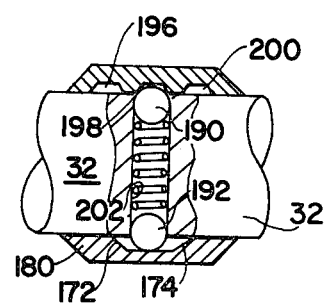
FIG. 6 is a schematic sectional view as taken on the line 6—6 of FIG. 5.

The portion of the pedal drive shaft 32 disposed within the fixed sleeve 154 is flatted as at 176, 178. A longitudinally displaceable shift collar member 180 having a cylindrical external surface is mounted on the flatted portion of the pedal drive shaft so as to be slidably displaceable therealong and conjointly rotatably displaceable therewith. The collar member 180 overlies the terminal end of the longitudinal channel 112 containing the elongate leaf spring actuating member 114. As clearly shown in FIGS. 2 and 3, the leaf spring actuating member 114 suitably comprises an elongate strip of spring steel or the like having one terminal end 184 thereof secured to the collar member 180 and an intermediate body portion 186 disposed within the channel 112 that is of a length adapted to place the angularly shaped terminal end portion 124 thereof in selective operative biasing engagement with the underside of the pawls 116 for the drive gears 92, 94 and 96 in accord with the selective positioning of the collar member 180 longitudinally of the flatted surfaces 176, 178 of the pedal drive shaft 32. As shown in FIG. 6, selective positioning of the collar member 180 at three discrete locations longitudinally of the pedal drive shaft 32 is assisted by spring loaded detent means in the form of a pair of ball detents 190, 192 urged by a spring disposed within a bore 202 in shaft 32 into one of three recesses 196, 198 and 200 located on the inner surface of the collar member 180, so as to selectively position the angularly shaped terminal end 124 of actuating member 114 in selective operative engagement with each of the pawls 116 for upwardly displacing the same into driving engagement with one of the drive gears 92, 94 and 96 as above described. Positive action of the detent system to displace the collar 180 from either of its limiting positions, as defined by recesses 196 and 200, to its intermediate position, as defined by recess 198, is effected by the sloping surfaces 172 and 174 that form the guide for ball detent 192.

Figure 10A:
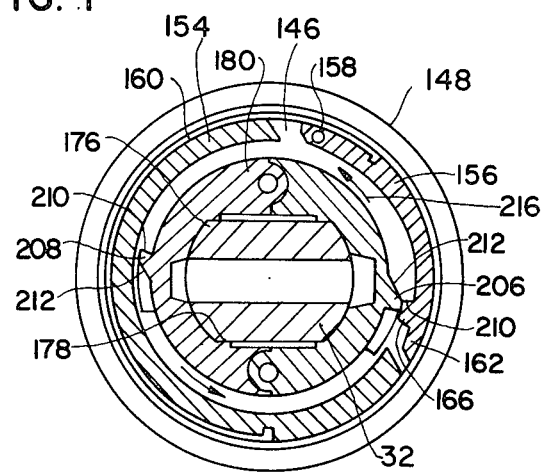
FIG. 10A and 10B are schematic sectional views, similar to FIG. 5, generally illustrative of operative interengagement of camming ridges with the pin members during pedal shaft rotation.
Figure 10B:
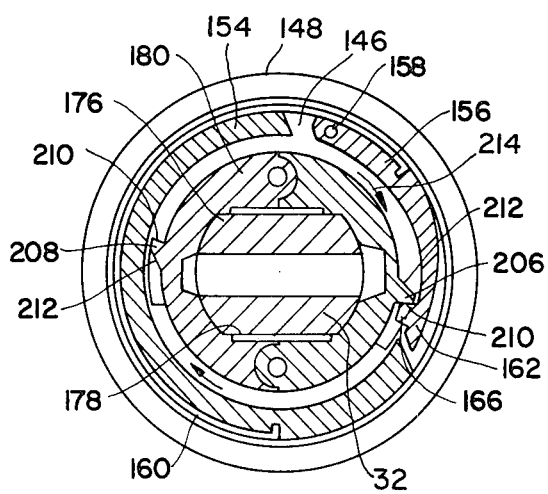

Referring now to FIGS. 5, 10A and 10B, camming means in the form of a pair of angularly disposed camming ridges 206 and 208 are mounted in diametrically opposed relation on the exterior cylindrical surface of the slidable shift collar 180. Each of the camming ridges include one perpendicular cam surface 210 and one slanted or inclined cam surface 212. Such are operatively related to the pins 166 and 168 on the pivotally mounted shift control member 156 so that engagement of the perpendicular cam surfaces 210 with such pin members 166 and 168 will effect axial displacement of the collar member 180 relative to the pedal drive shaft 32 as the latter is rotated in reverse direction and that engagement of the inclined cam surfaces 212 with the pin members 166 and 168 will effect an outward pivotal displacement of control member 156 and no displacement of the collar 180 relative to the pedal drive shaft 32 when the latter is being rotated in the forward direction.

As shown in FIG. 10A, rotation of the pedal drive shaft 32 in the normal or bicycle driving direction, as indicated by the arrow 216, causes the slanted or inclined cam surfaces 212 of the camming ridges 206 and 208 to repetitively engage either one of the pin members 166 and 168 on the hinged control member 156. Each such engagement causes the engaged pin member 166 or 168 to ride up the inclined cam surface 212 and outwardly displace the free end 164 of the hinged control member 156 into a retracted position against the inward biasing action of the spring member 160, which functions to return the hinged control member 156 into its advanced position in coplanar relation with the interior surface of the sleeve 154 once the camming ridge has been advanced past the pins 166, 168. Thus, during the normal or forward rotation of the pedal drive shaft 32, the collar member 180 rotates in conjunction therewith without any lineal or axial displacement of the collar 180 axially of the drive shaft 32.

In contrast thereto and as shown in FIG. 10B, rotative displacement of the pedal drive shaft 32 and collar member 180 in the reverse direction, as illustrated by the arrow 214, will, at one particular and readily locatable point of pedal positioning, effect engagement of the perpendicular surface 210 of camming ridge 206 with the sidewall of one of the pins 166 or 168. As will now be also apparent, the perpendicular surface 210 of the second camming ridge 208 will engage the sidewall of one of the pins 166 or 168 at a second particular and readily locatable point of pedal positioning that is 180° removed from the above described first point of engagement. Under such engagement, the hinged control member will not be displaced from its advanced position coplanar with the interior surface of the sleeve 154 but rather will remain in its advanced position.

Figure 11D:
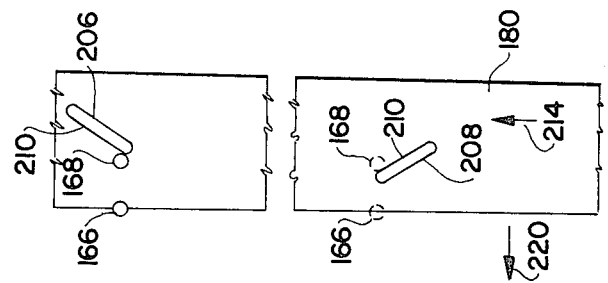
FIGS. 11A through 11D are schematic unfolded plan views of the collar surface, camming ridges thereon and the pin members on the pivotally mounted shift control member and are illustrative of the operative interengagement of the camming ridges with the pin members during shifting operations in response to pedal shaft displacement.
Figure 11C:
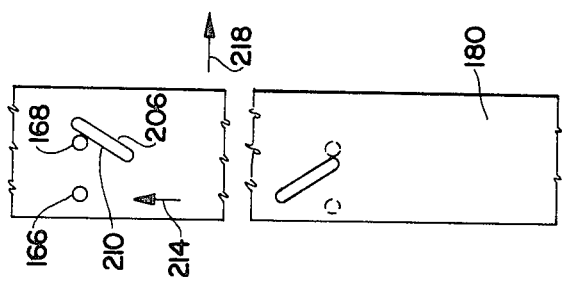
Figure 11B:
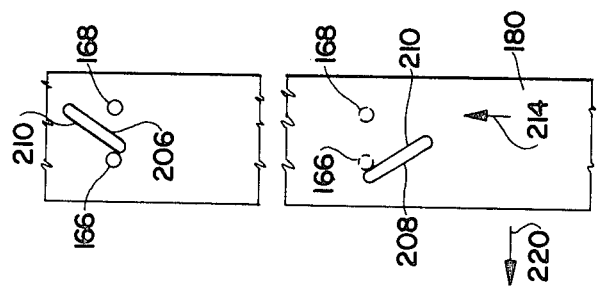
Figure 11A:
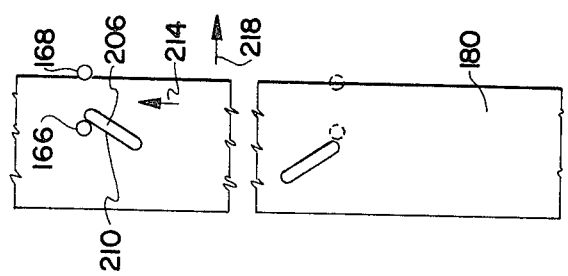

Referring now also to FIGS. 11A through 11D by way of example, which is an unfolded plan view of the cylindrical surface of the shift collar 180, the upshifting and downshifting action effected through interengagement of the perpendicular cam surfaces 210 and the pins 166 and 168 on the control member 156 will be described. In FIG. 11A, the perpendicular surface 210 of the camming ridge 206 is disposed in abutting engagement with the pin 166 as would be obtained, for example, by location of the left pedal crank 36 and left drive pedal 40 at a first predetermined point in their path of rotation. When so positioned, the leaf spring actuating member 114 will be at its limiting advanced position in engagement with the drive pawl 116 for the outermost drive gear 96 and with such gear disposed in driving engagement with the pedal drive shaft 32. When the components are so located, continued reverse rotational displacement of the collar member 180 as indicated by the arrow 214 through a limited arc, as determined by the length and pitch of the camming ridge 206, will effect a concomitant lineal displacement of the collar 180 axially of the pedal drive shaft 32 as indicated by the arrow 218 and to the positioning illustrated in FIG. 11B as the camming ridge 206 is displaced past the pin 166. Such positive displacement of the collar 180 will effect an accompanying displacement of the leaf spring actuating member 114 from its advanced position to an intermediate position in engagement with the drive pawl 116 for the intermediate drive gear 94 and with the latter intermediate gear 94 now being disposed in driving engagement with the pedal drive shaft 32 upon resumption of forward rotational displacement of the latter.

As will be apparent from a comparison of FIGS. 11A, 11B and 11C, the described collar displacement will selectively locate the perpendicular surface 210 of the camming ridge 206 in position to operatively engage the second pin 168 on the control member 156 whenever the left pedal crank 36 and left drive pedal 40 are again disposed at the above noted first predetermined point in their path of rotation, as illustrated in FIG. 11C. When the components are so located, continued reverse rotational displacement of the collar member 180, as indicated by the arrow 214, through a limited arc, as determined by the length and pitch of the camming ridge 206, will effect a concomitant lineal displacement of the collar 180 axially of the pedal drive shaft 32 as indicated by the arrow 218 and to the positioning illustrated in FIG. 11D as the camming ridge is displaced past the pin 168. Such positive displacement of the collar 180 will effect an accompanying displacement of the leaf spring actuating member 114 from its intermediate position, as above described, to its fully retracted position in engagement with the drive pawl for the drive gear 92 and with the latter gear 92 now being disposed in driving engagement with the pedal drive shaft 32 upon resumption of forward rotational displacement of the latter.

As also shown in FIG. 11D, such displacement of the collar 180 has selectively located the diametrically disposed second camming ridge 208 so that its perpendicular surface 210 is positioned to operatively engage the second pin 168 (shown dotted) whenever the left pedal crank 36 and left drive pedal 40 are disposed at a second predetermined point, 180° removed from the above described first point, in their path of rotation. When the components are so located, continued reverse rotational displacement of the collar member 180, as indicated by the arrow 214, through a limited arc as determined by the length and pitch of the camming ridge 208, will effect a concomitant lineal displacement of the collar 180 axially of the pedal drive shaft 32 as indicated by the arrow 220 and to the positioning illustrated in FIGS. 11C and 11B, as the camming ridge 208 is displaced past the pin 168. Such positive displacement of the collar 180 will effect an accompanying displacement of the leaf spring actuating member 114 from its retracted position into its intermediate position in engagement with the drive pawl 116 for the intermediate drive gear 94 and with the latter intermediate gear now being disposed in driving engagement with the pedal drive shaft upon resumption of the forward rotational displacement of the latter.

As will be apparent from a comparison of FIGS. 11D, 11C and 11B, the above described collar displacement will selectively locate the perpendicular surface 210 of the camming ridge 208 in position to operatively engage the pin 166 on the control member 156 whenever the left pedal crank 36 and left drive pedal 40 are again disposed at the above noted second predetermined point in their path of rotation. As will also be apparent from FIGS. 11B and 11C, when the collar 180 is in its intermediate position both the camming ridges 206 and 208 are selectively located for pin engagement to permit either upshifting or downshifting at the option of the rider.

When the perpendicular surface 210 of the camming ridge 208 is positioned relative to the pin 166 as shown in FIG. 11B, continued reverse rotational displacement of the collar member 180 as indicated by the arrow 214, through the limited arc determined by the length and pitch of the ridge 208 will effect a concomitant lineal displacement of the collar 180 axially of the pedal drive shaft 32 in the direction indicated by the arrow 220 and to the position illustrated in FIG. 11A. In the manner described above, such collar displacement will effect an accompanying displacement of the actuating member 114 from its intermediate to its fully advanced position wherein the drive gear 96 is disposed in driving engagement with the pedal shaft 32 upon resumption of forward rotational displacement of the latter.

In the above described construction, shifting is limited to collar displacement intermediate the above described advanced and retracted positions. Thus, once the limit of upshifting or downshifting has been effected, no further undirectional shifting can be effected since the operative camming ridges will be positioned out of operative range of the pins.

As will now be apparent, the diametrically separated location and opposed positioning of the camming ridges 206 and 208 effectively locates two predeterminable positions for the right and left pedals 38 and 40, at which reverse rotation through a small arc as determined by the length and pitch of the camming ridges 206 and 208 will effect "upshifting" or "downshifting" of the transmission. For example, upshifting may be conveniently effected by limited reverse rotation, for example, through about 30° of reverse movement of the right pedal 38 when such pedal is in its lowermost position and downshifting effected by similar limited reverse rotation of the left pedal 40 when such pedal is in its lowermost position.

As above described, a predetermined minimum amount of reverse rotative displacement of the pedal drive shaft 32 is required, at either of the two defined locations to effect a shifting of the gears. At the time that such minimum degree of reverse rotative displacement of the pedal drive shaft 32 has been effected, the action of the spring loaded indent ball 190 will complete the displacement of the collar 180 necessary to effect the desired gear shift through transfer of the indent ball 190 to the adjacent locking recess. If however, reverse rotation is initiated at the proper location but the minimum required amount of reverse displacement is not effected by the rider, the action of the spring biased indent ball 192 under the action of the sloping seat surfaces 172 or 174, will serve to relocate the collar 180 in its intermediate position, where the indent ball 190 is seated in recess 198.

As will now be apparent to those skilled in this art, axial displacement of the collar 180 in response to reverse rotation of the drive pedal shaft could be similarly effected by mounting the camming ridges on the sleeve 154 and locating the pins 166 and 168 on the collar 180. For example, a pair of shift control members disposed 180° apart could have the camming ridges mounted thereon and with the pin members 166 and 168 mounted on the collar. Likewise, the camming ridges could be integral with the sleeve 154 and the pins 166 and 168 mounted on a pivotally displaceable control member forming a part of the collar 180.

FIGS. 12-16 disclose the essential elements of alternative and simplified construction for effecting, in response to a predetermined limited amount of reverse drive pedal shaft rotation, the controlled longitudinal displacement of the elongate leaf spring actuating member 114 within the channel 112 in the pedal drive shaft to effect the selective driving engagement of the drive gears 92, 94 and 96 by pawl elevation as described above.

The pedal drive shaft 32 is here journalled within the generally cylindrical shell 148 of the pedal hub 30 by spaced ball bearings 150, 152. Terminating at or slightly below the upper surface of the pedal hub 30 is the lower end of the seat post frame member 16. Such seat post member 16 is conventionally formed of hollow tubing and is here terminally welded to a receptor aperture in the pedal hub 30, as at 302. Mounted within the terminal end of the seat post member 16, and secured in position therein by a set screw 304, is a plug member 306. Mounted within a suitable axial bore in the plug 306 is an axially displaceable shift pin 308 whose lower end is adapted to extend a predetermined distance beyond the end of the plug 306, into the interior of the pedal hub 30 and to be disposed in advanced compressive sliding engagement with the surface of a shift collar member 312 slidably mounted on the pedal drive shaft 32. The shift pin 308 is normally biased into such advanced position within the pedal hub by a spring 310 disposed within the upper end of the bore in the plug 306.

Mounted on the portion of the pedal drive shaft 32 disposed within the pedal hub 30, in such manner as to be slidably displaceable therealong and rotatably displaceable in conjunction therewith, is a shift collar member 312. Such permitted movement, as delineated above, is readily effected by an inwardly extending key member 313 sized to be contained within the channel 112 on the pedal drive shaft 32. Secured to the collar member 312 and disposed within the elongate channel 12 is the leaf spring actuating member 114 as described in detail earlier in the specification.

In contradistinction to the protruding camming ridges 206 and 208 on the surface of the shift collar 180 as heretofore described, the camming means for this simplified embodiment includes, for a three speed transmission, two selectively shaped and diametrically opposed pairs of recessed camming channels 320 and 322 in the surface of the shift collar 312 that are operatively engageable by the shift pin 308 as described above.

Figure 12:
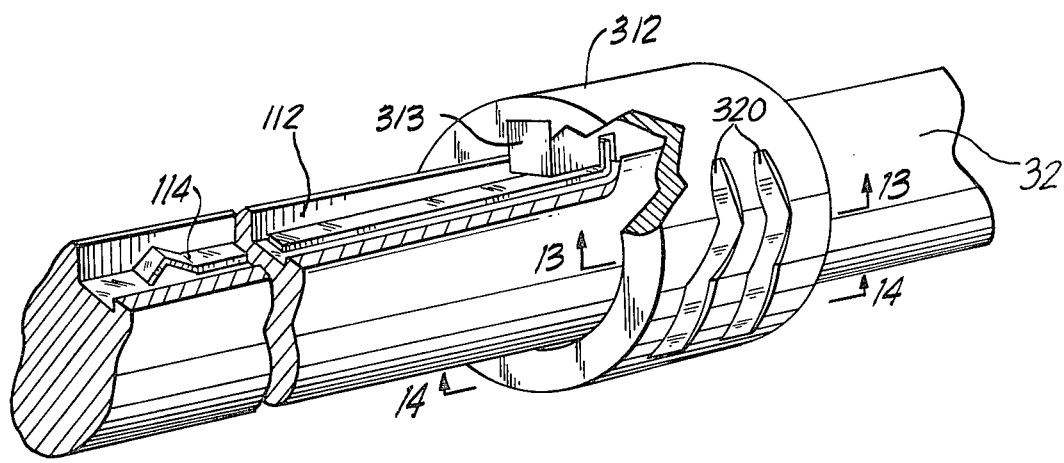
FIG. 12 is a schematic oblique view, partially cut away, of a longitudinally displaceable shift collar member as mounted on the pedal drive shaft for an alternative drive pedal responsive shifting mechanism located within the pedal hub of a bicycle.
Figure 13:
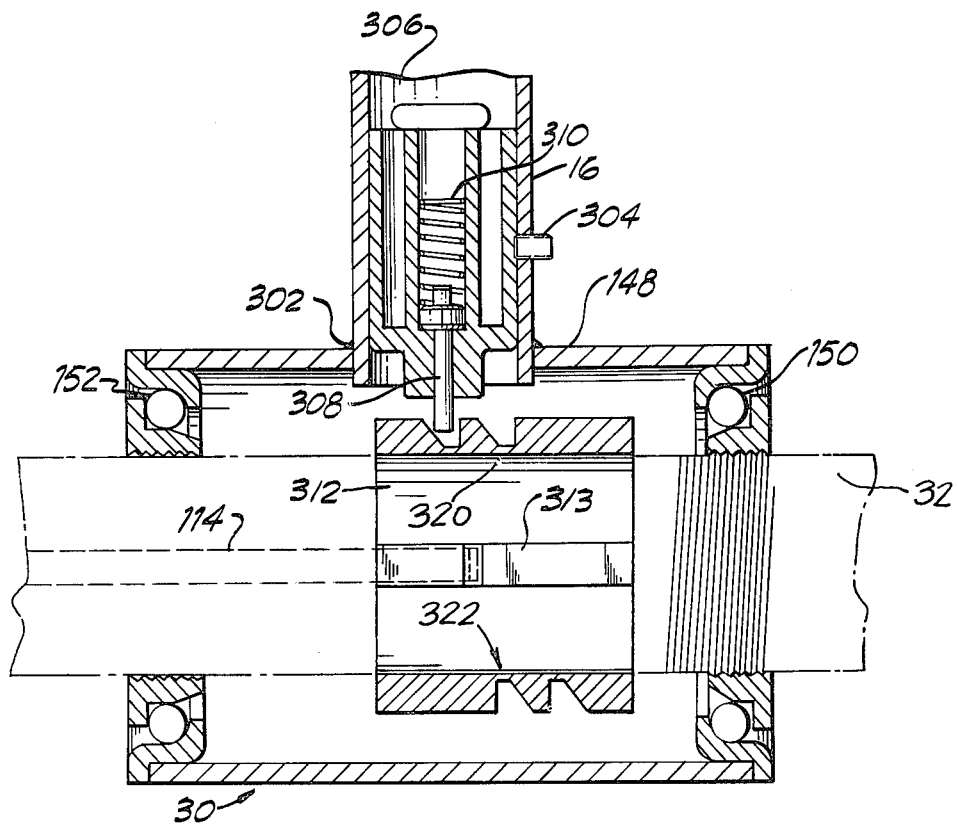
FIG. 13 is a vertical sectional view of the essential elements of such alternative drive pedal responsive shifting mechanism, and showing the cam channel cross sectional configuration as taken on the lines 13—13 in FIG. 12.
Figure 14:
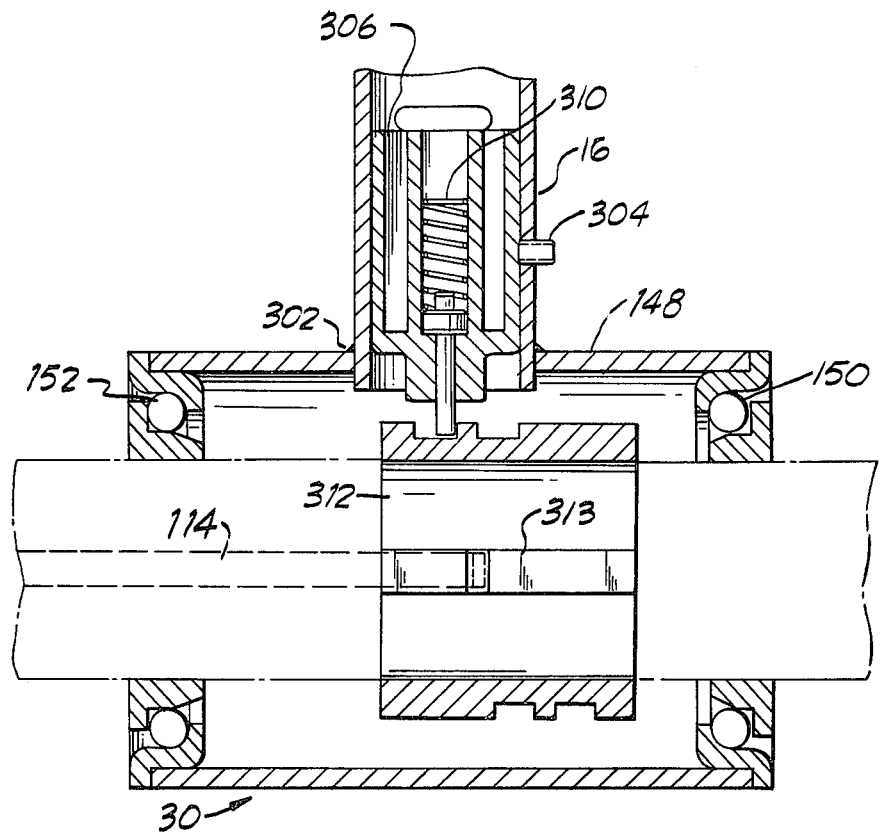
FIG. 14 is a fragmentary vertical section showing the cam channel cross sectional configuration as taken on the line 14—14 of FIG. 12.
Figure 15:
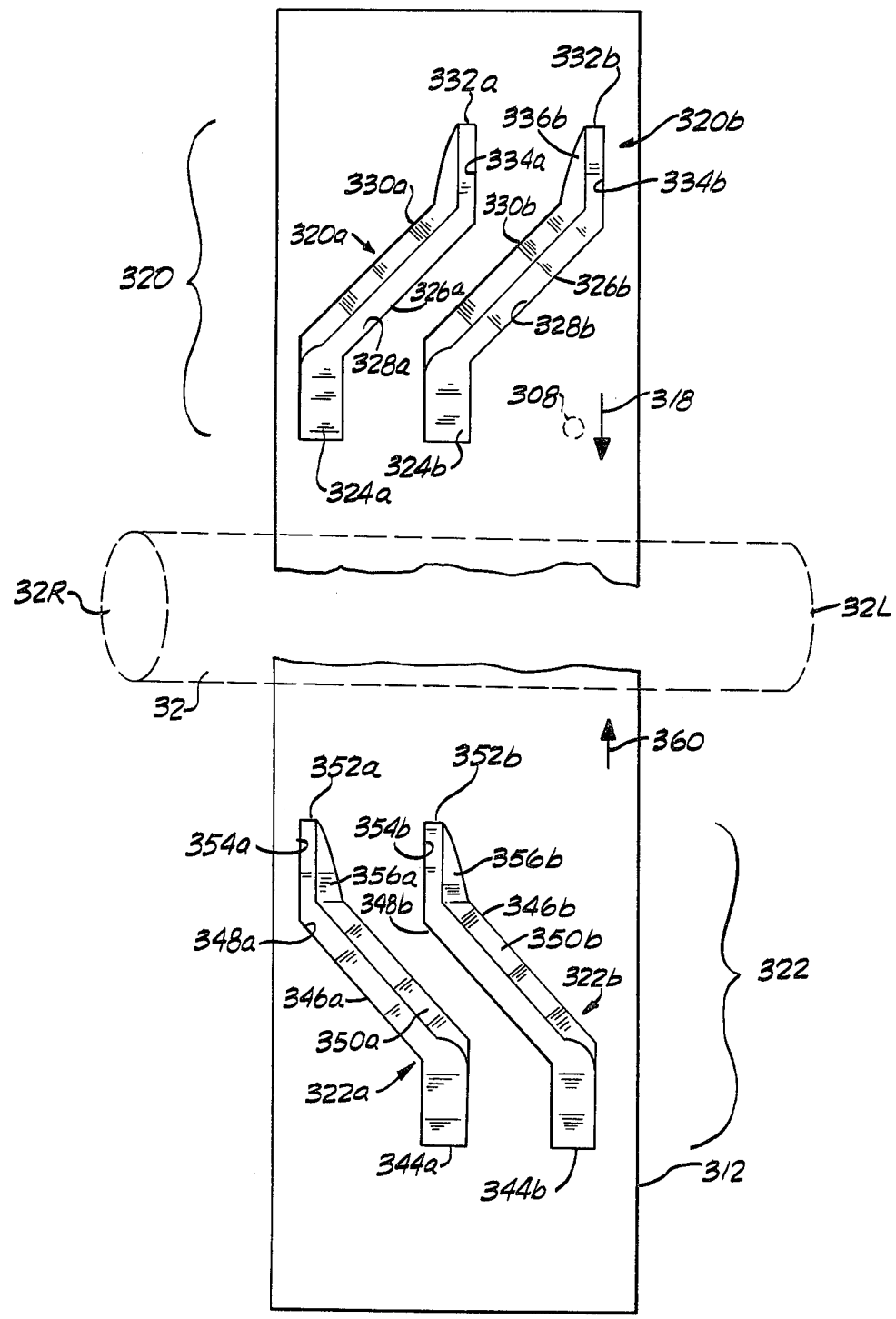
FIG. 15 is a schematic unfolded plan view of the shifting collar surface to illustrate the configuration and positioning of the camming channels therein.

As best shown in FIG. 15 and as also shown in FIGS. 12-14, the first pair of camming tracks 320 are disposed in parallel spaced relation and generally transverse to the longitudinal axis of the shift collar 312. The individual tracks 320a and 320b of such first pair of camming tracks 320 each include, when considered in terms of the normal direction of rotation of the pedal shaft 32 to effect forward motion of the bicycle and as indicated by the arrow 318, an entry section 324a, 324b of progressively increasing depth and having essentially perpendicular side walls; an angularly offset intermediate section 326a, 326b of essentially uniform depth, offset from right to left in relation to the pedal shaft ends 32R and 32L and having one perpendicular side wall 328a, 328b and one sloped or inclined side wall 330a, 320b; and a trailing section 332a, 332b of progressively decreasing depth having one perpendicular side wall 334a, 334b forming a continuation of the perpendicular side walls 3328a, 328b respectively and one sloped or inclined side wall 336a, 336b forming a continuation of the sloped side wall 330a, 330b respectively.

In a similar manner the second pair of camming tracks 322 are disposed in parallel spaced relation generally transverse to the longitudinal axis of the shift collar 312 and in diametrically opposed relation to said first pair of camming tracks 320.

The individual tracks 322a and 322b of said second pair of camming tracks 322 each include, again when considered in terms of the normal direction of rotation of the pedal shaft 32 to effect forward motion of the bicycle as indicated by the arrows 318, an entry section 344a, 344b of progressively increasing depth and having essentially perpendicular side walls; an angularly offset intermediate section 346a, 346b of essentially uniform depth and offset from left to right in relation to the pedal shaft ends 32R and 32L and having one perpendicular side wall 348a, 348b and one sloped or inclined side wall 350a, 350b; and a trailing section 352a, 352b of progressively decreasing depth having one perpendicular side wall 354a, 354b forming a continuation of the perpendicular side walls 348a, 348b respectively and one sloped or inclined side wall 356a, 356b forming a continuation of the sloped side wall 350a, 350b respectively.

The above described pairs of cam tracks 320 and 322 in the shift collar 312 are operatively related to the shift pin 308, which is normally biased by the spring 310 into compressive engagement with the shift collar surface, in such manner that engagement thereof with the perpendicular side walls 328a, 328b or 348a and 348b of intermediate sections 326a 326b or 346a, 346b respectively, will effect an axial displacement of the shift collar member 312 relative to the pedal drive shaft 32 as the latter is rotated in reverse direction (as indicated by the arrow 360) and that engagement thereof with the sloped or inclined surfaces 330a, 330b and 350a, 350b will only effect a reciprocation of the shift pin 308 and no longitudinal displacement of the shift collar 312 on the pedal shaft 32 when the latter is rotated in either reverse or forward direction.

As shown in FIG. 15, rotation of the pedal drive shaft 32 in the normal or bicycle driving direction, as indicated by the arrow 318, relative to the shift pin 308 (indicated by dotted line) causes the pin 308 to ride on the surface of the shift collar 312 and to always enter a cam track through the entry section thereof or by dropping down an advancing perpendicular side wall. In each such instance the pin 308 will move downward or advance relative to the plug 306 under the action of the biasing spring 310. Such forward direction of pedal shaft rotation also causes the pin 308 to repetitively engage the sloped or inclined side wall portions of the camming tracks or the trailing sections thereof with each such engagement effecting a progressive upward or retractive displacement of the shift pin 308 within the plug 306 against the action of the biasing spring 310. Thus, during the normal or forward rotation of the pedal drive shaft 32, the shift collar member 312 rotates in conjunction therewith without any lineal or axial displacement of the collar 312 axially of the drive shaft 32, through engagement with the shift pin 308.

In contrast thereto and as also shown in FIG. 15, rotative displacement of the pedal drive shaft 32 and collar member 312 in the reverse direction, as illustrated by the arrow 360, will, at one particular and readily locatable locus of pedal positioning, effect the engagement of the perpendicular side wall surfaces 328a or 328b of camming track 320 with the shift pin 308. As will now be also apparent, the perpendicular side wall surfaces 348a or 348b of the second camming track 322 will also engage the shift pin 308 at a second particular and readily locatable locus of pedal positioning that is 180° removed from the above described first locus of pin engagement. At each such locus of pin engagement, the shift pin 308 will not be displaced from its advanced to its retracted position but will remain in advanced position and effect a longitudinal displacement of the shift collar 312 on the pedal shaft 32. As will now be apparent, the direction and length of such displacement will be determined by the length and angular disposition of the offset intermediate sections of the two pairs of camming tracks 320 and 322.

Figures 16A, 16B, 16C:
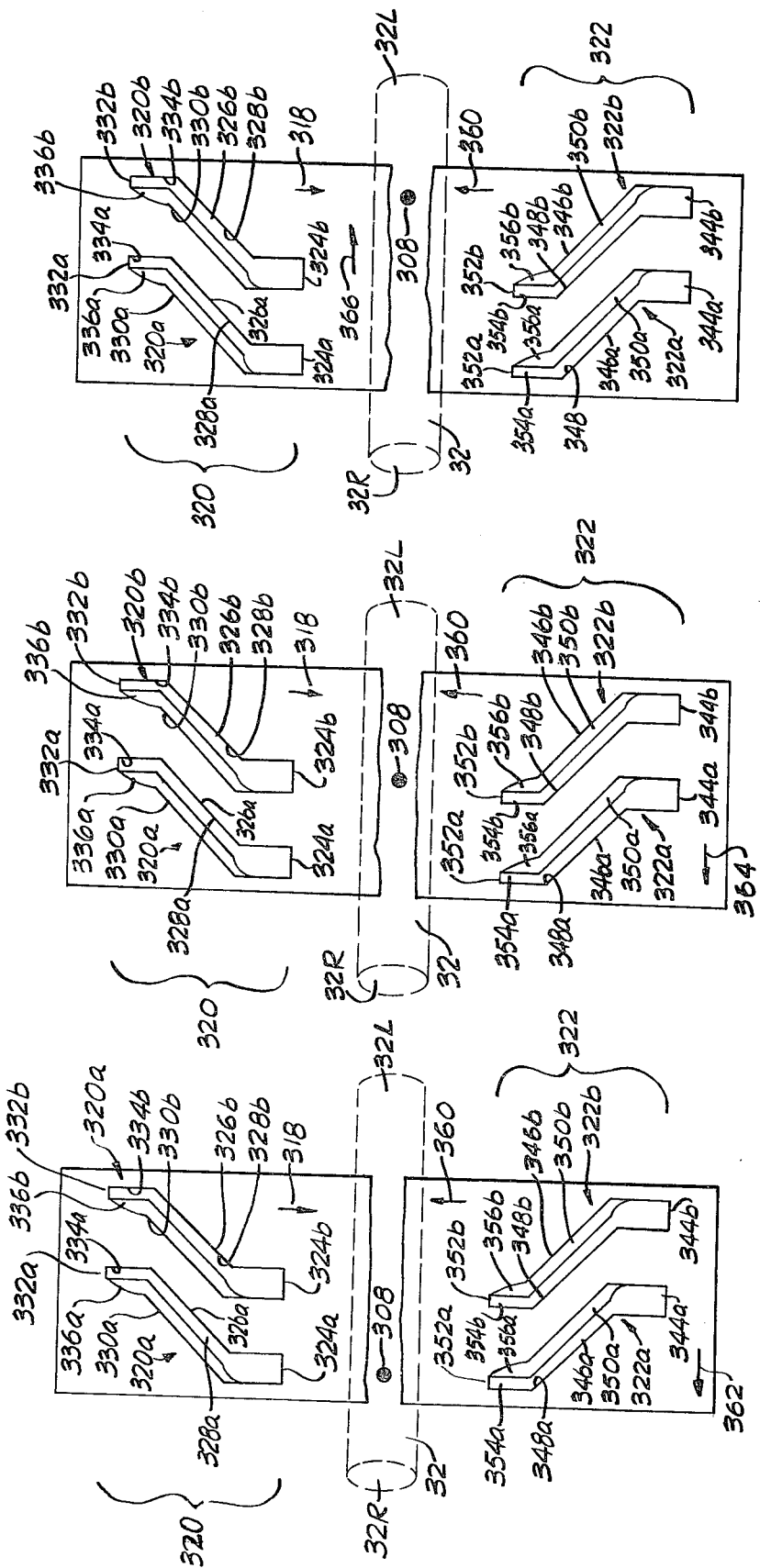
FIGS. 16A through 16C are schematic unfolded plan views of the shift collar surface, the camming channels therein and the shift pin member and are illustrative of the operative interengagement of the camming channels with the shift pin member during shifting operations in response to reverse pedal pedal shaft displacement.

Referring now also to FIGS. 16A through 16C by way of example, which are unfolded plan views of the cylindrical surface of the shift collar 312, the upshifting and downshifting action effected through interengagement of the perpendicular side wall portions of the intermediate sections of the pairs of cam tracks 320 and 322 with the shift pin 308 during reverse rotation of the pedal shaft 32 as indicated by the arrow 360 will be described. FIG. 16A shows the location of the shift collar 312 relative to the shift pin 308 when the collar 312 is in its leftward limiting position i.e. disposed nearest to pedal shaft end 32L and with the leaf spring actuating member 114 at its limiting retracted position (see FIG. 2) having its cam surface 124 disposed in elevating engagement with drive pawl 116 for drive gear 92 and with such gear 92 being thus disposed in driven engagement with pedal drive shaft 32. When the components are so located, reverse rotational displacement of the collar member 312 in the direction indicated by the arrow 360, through a limited arc as determined by the length and pitch of the offset intermediate section 346a of camming tracks 322a, will effect a concomitant lineal displacement of the collar 312 axially of the pedal drive shaft 32 in the direction indicated by the arrow 362 toward pedal shaft end 32R and to the position illustrated in FIG. 16B, as the perpendicular side wall 348a is displaced past the pin 308. Such predetermined actuating location in the orbit of pedal shaft rotation may be located, for example, at the lowermost position of the left pedal 38 and the arc necessary to traverse the intermediate section of the cam track may be about 30°. Such positive displacement of the collar 312 will effect and accompanying displacement of the leaf spring actuating member 114 from its advanced position to an intermediate position where the actuating section 124 is disposed in elevating engagement with the drive pawl 116 for the intermediate drive gear 94 (as shown in FIG. 2) and with the latter intermediate gear 94 now being disposed in driven engagement with the pedal drive shaft 32 upon resumption of forward rotational displacement of the latter.

As will be apparent from a comparison of FIGS. 16A and 16B, the above described degree and direction of collar displacement will also selectively locate (as shown in FIG. 16B) the perpendicular surface 348b of the intermediate section 346b of camming track 322b in position to operatively engage the shift pin 308 whenever the drive pedal shaft 32 is again disposed at the above noted first predetermined point in its path of rotation, i.e. when the left pedal 38 is at its lowermost position. When the shift collar 312 is so located, a second such reverse rotational displacement of the collar member 312, as indicated by the arrow 360, through the above described arc, as determined by the length and pitch of the intermediate section 346b of camming track 322b, will effect a concomitant further linear displacement of the collar 312 axially of the pedal drive shaft 32 and toward the right end 32R of the pedal shaft 32 as indicated by the arrow 364 and to the position illustrated in FIG. 16C as the vertical wall 348b of camming track 322b is displaced past the pin 308. Such positive displacement of the collar 312 will effect an accompanying displacement of the leaf spring actuating member 114 from its intermediate position, as above described, to its fully advanced position in elevating engagement with the drive pawl for the drive gear 96 and with the latter gear 96 now being disposed in driven engagement with the pedal drive shaft 32 upon resumption of forward rotational displacement of the latter. Through the above described series of shifting operations the speed of forward motion of the bicycle has been brought from its high speed, to its intermediate speed, and then to its low speed.

As also shown in FIG. 16C, such displacement of the collar 312 has selectively located the diametrically disposed camming track 320b so that the perpendicular surface 328b of the intermediate section 326b thereof is positioned to operatively engage the shift pin 308 whenever the left pedal crank 34 and left drive pedal 38 are disposed at a second predetermined point, 180° removed from the above described first point, in their path of rotation. At such diametrically opposed location the right pedal 40 will be disposed at its lowermost point in its point of rotation. When the components are so located, a reverse rotational displacement of the collar member 312, as indicated by the arrow 360, through a limited arc as above described and as determined by the length and pitch of the intermediate section 326b of camming track 320b will effect a concommitant lineal displacement of the collar 312 axially of the pedal drive shaft 32 and toward the left end 32L thereof as indicated by the arrow 366 and to the position illustrated in FIG. 16B, as the perpendicular surface 328b is displaced past the shift pin 308. Such positive displacement of the collar 312 will effect an accompanying displacement of the leaf spring actuating member 114 from its advanced position into its intermediate position and into elevating engagement with the drive pawl 116 for the intermediate drive gear 94 and with the latter intermediate gear now being disposed in driven engagement with the pedal drive shaft upon resumption of the forward rotational displacement of the latter.

As will be apparent from a comparison of FIGS. 16C and 16B, the above described collar displacement will also selectively locate the perpendicular surface 328a of the intermediate section 326a of the camming track 320a in position to operatively engage the shift pin 308 whenever the right drive pedal 40 is again disposed at its lowermost point in its path of rotation. As will also be apparent from FIGS. 16A, 16B and 16C, when the collar 312 is in its intermediate position both the camming tracks 320a and 322b are selectively located for pin engagement to permit either upshifting or downshifting at the option of the rider.

When the perpendicular surface 328a of the intermediate section 326a of camming track 320a is positioned relative to the shift pin 308 as shown in FIG. 16B, a second such reverse rotational displacement of the collar member 312 as indicated by the arrow 360, through the limited arc determined by the length and pitch of the intermediate section 326a will effect a concommitant lineal displacement of the collar 312 axially of the pedal drive shaft 32 in the direction toward pedal shaft end 32L as indicated by the arrow 366 and to the position illustrated in FIG. 16A. In the manner described above, such collar displacement will effect an accompanying displacement of the actuating member 114 from its intermediate to its fully retracted position wherein the drive gear 92 is disposed in driven engagement with the pedal shaft 32 upon resumption of forward rotational displacement of the latter.

Through the above described series of shifting operations, the speed of forward motion of the bicycle has been brought from its low speed to its intermediate speed and then to its high speed and concomitant return to low speed.

As will now be apparent, the diametrically separated location and opposed positioning of the perpendicular surfaces on the intermediate sections of the two pairs of camming tracks 320 and 322 effectively locates two predeterminable positions for the right and left pedals 40 and 38, at which reverse rotation through small arc as determined by the length and pitch of the intermediate sections of the camming tracks will effect "upshifting" or "downshifting" of the transmission. For example, upshifting may be conveniently effected by limited reverse rotation, for example, through about 30° of reverse movement of the right pedal 40 when such pedal is in its lowermost position and downshifting effected by similar limited reverse rotation of the left pedal 38 when such pedal is in its lowermost position.

The foregoing pedal responsive multi-speed transmission provides enhanced safety for the bicycle rider in that it does not require release of the handle bars by the operator or diversion of vision from the path of travel during shifting operations entirely apart from a rapidity of operation that minimizes the time required to change speeds. The described system is also essentially fail-safe in that if any pawl member biasing spring fails and permits its pawl 116 to become drivingly engaged with its related drive gear, then such gear will operatively drive the bicycle unless another and deliberately engaged drive gear happens to be one that would drive the bicycle at a higher speed. Thus, if through biasing spring failure, more than one drive gear gets drivingly engaged with the rotating pedal drive shaft 32, the drive gear that will produce the highest speed will do the driving and the other gear will be overriden due to the sloping upper surface of the drive pawls 116.

Having thus described my invention, I claim:

1. In a pedal displacement actuable multi-speed transmission for bicycles, comprising
   a pedal shaft rotatably displaceable within the pedal shaft hub of a bicycle frame,
   gear means adapted for selected driving engagement with said pedal shaft,
   a collar member mounted on said pedal shaft for rotation in conjunction therewith and permitted longitudinal displacement therealong,
   camming means disposed on the surface of said collar member,
   shift control means disposed within said pedal shaft hub, displaceable radially of said pedal shaft and operatively engageable with said camming means in response to a predetermined arc of reverse rotative displacement of said pedal shaft for displacing said collar member longitudinally of said pedal shaft for effecting the selected connection of said gear means into driving engagement with said pedal shaft.

2. A bicycle transmission as set forth in claim 1 wherein said shift control means is selectively displaced radially of said pedal shaft during forward rotation displacement of said pedal shaft without longitudinal displacement of said collar member relative to said pedal shaft.

3. A bicycle transmission as set forth in claim 1 wherein said camming means comprises a pair of diametrically positioned and oppositely disposed camming ridges.

4. A bicycle transmission as set forth in claim 1 wherein said shift control means comprises at least one pin member.

5. A bicycle transmission as set forth in claim 1 wherein said shift control means further comprises
   a pivotally mounted shift control member displaceable radially of said pedal shaft disposed in spaced relation with said collar means and supporting pin means engageable with said collar member.

6. A bicycle transmission as set forth in claim 1 including spring biased detent means for selectively positioning said collar member at a plurality of predetermined locations longitudinally of said pedal shaft.

7. A bicycle transmission as set forth in claim 1 further including
a fixed sleeve mounted in said pedal shaft hub disposed in surrounding spaced relation with said collar member
and wherein said shift control means is pivotally mounted on said sleeve means and has at least one pin member inwardly extending therefrom and
wherein said camming means comprises outwardly extending ridge means selectively engageable with said inwardly extending pin means on said shift control means for effecting displacement of said collar means longitudinally of said pedal shaft during reverse rotation thereof.

8. The combination as set forth in claim 7 wherein said ridge means are disposed in diametrically opposed relation on the outer surface of said collar means.

9. A bicycle transmission as set forth in claim 8 including means normally biasing said pin member into compressive engagement with the surface of said collar member.

10. The bicycle transmission as set forth in claim 1 wherein
said shift control means comprises a pin member extending inwardly of said pedal shaft hub and
said camming means comprises recessed channels in said collar member engageable with said pin member.

11. A bicycle transmission as set forth in claim 1 wherein said camming means includes a first pair of recessed camming channels positioned in diametrically opposed relation to a second pair of recessed camming channels on the outer surface of said collar means.

12. A bicycle transmission as set forth in claim 1 wherein said camming means comprises an angularly disposed recessed channel having a substantially perpendicular side wall engageable with said shift control means during reverse rotative displacement of said pedal shaft to effect collar displacement longitudinally of said pedal shaft.

13. A bicycle transmission as set forth in claim 12 wherein said angularly disposed channel has a sloped side wall disposed in spaced facing relationship with said substantially perpendicular side wall selectively engageable with said pin member during forward rotative displacement of said pedal shaft to permit rotative displacement of said collar in conjunction with forward rotative displacement of said pedal shaft without longitudinal displacement of said collar relative thereto.

14. A pedal displacement actuable multi-speed transmission for bicycles, comprising
a pedal shaft rotatably displaceable within the pedal shaft hub of a bicycle frame,
a plurality of drive gears rotatably mounted on said pedal shaft,
a change gear disposed in meshed engagement with each of said drive gears, each of said change gears being mounted for conjoint rotation on a common shaft,
means for connecting each of said drive gears into selective driving engagement with said pedal shaft,
a pin member extending inwardly of said pedal shaft hub,
collar means having recessed camming channel means on the surface thereof mounted on said pedal shaft for rotation in conjunction therewith and permitted longitudinal displacement therealong,
said recessed camming channel means being operatively engageable with said pin member in response to a predetermined arc of reverse rotative displacement of said pedal shaft for displacing said collar means longitudinally thereof, and
means responsive to the positional location of said collar means longitudinally of said pedal shaft for effecting the selected connection of said drive gears into driving engagement with said pedal shaft.

15. A pedal displacement actuable multi-speed transmission for bicycles, comprising
a cyclindrical pedal shaft hub having a tubular bicycle frame member terminally mounted thereon,
a pedal shaft rotatably displaceable within said pedal shaft hub,
a plurality of drive gears rotatably mounted on said pedal shaft,
means for connecting each of said drive gears into selective driving engagement with said pedal shaft,
a plug member mounted in said tubular frame member at the junction thereof with said pedal shaft hub,
collar means mounted on said pedal shaft for rotation in conjunction therewith and permitted longitudinal displacement therealong,
a displaceable shift pin mounted in said plug member biased into compressive engagement with the surface of said collar member,
recessed camming channel means on the surface of said collar means and operatively engageable with said shift pin in response to a predetermined arc of reverse rotative displacement of said pedal shaft for displacing said collar means longitudinally thereof, and
means responsive to the positional location of said collar means longitudinally of said pedal shaft for effecting the selected connection of said drive gears into driving engagement with said pedal shaft.

16. A bicycle transmission as set forth in claim 15 wherein said recessed camming channel means includes a first pair of selectively shaped channels positioned in diametrically opposed relation to a second pair of selectively shaped channels in the surface of said collar means.

17. A bicycle transmission as set forth in claim 16 wherein each of said channels includes an angularly disposed section having a substantially perpendicular side wall selectively engageable with said pin member during reverse rotative displacement of said pedal shaft to effect collar displacement longitudinally of said pedal shaft.

18. A bicycle transmission as set forth in claim 17 wherein each said angularly disposed channel has a sloped side wall disposed in spaced facing relationship with said substantially perpendicular side wall selectively engageable with said pin member during forward rotative displacement of said pedal shaft to permit rotative displacement of said collar in conjunction with forward rotative displacement of said pedal shaft without longitudinal displacement of said collar relative thereto.

19. In a multi speed transmission for bicycles
a drive shaft rotatably displaceable in response to pedal displacement,
a collar member having selectively contoured camming means on the outer surface thereof mounted on said pedal shaft for rotation in conjunction therewith and permitted longitudinal displacement therealong, shift pin means engageable with said contoured camming means and selectively responsive to a predetermined arc of reverse rotative displacement of said drive shaft for displacing said collar means longitudinally thereof.

* * * * *